(12) United States Patent
Burkart

(10) Patent No.: US 8,358,029 B2
(45) Date of Patent: Jan. 22, 2013

(54) ROTOR-SHAFT INTEGRATED GENERATOR DRIVE APPARATUS

(75) Inventor: Stefan Burkart, Schermbeck (DE)

(73) Assignee: General Electric Company, Schenectady, NY (US)

( * ) Notice: Subject to any disclaimer, the term of this patent is extended or adjusted under 35 U.S.C. 154(b) by 538 days.

(21) Appl. No.: 12/566,405

(22) Filed: Sep. 24, 2009

(65) Prior Publication Data
US 2011/0068583 A1 Mar. 24, 2011

(51) Int. Cl.
F03D 9/00 (2006.01)
H02P 9/04 (2006.01)

(52) U.S. Cl. .......................................... 290/55
(58) Field of Classification Search .................. 290/44, 290/55
See application file for complete search history.

(56) References Cited

U.S. PATENT DOCUMENTS

| | | |
|---|---|---|
| 4,291,233 A | 9/1981 | Kirschbaum |
| 4,871,923 A | 10/1989 | Scholz et al. |
| 5,663,600 A | 9/1997 | Baek et al. |
| 6,232,673 B1 | 5/2001 | Schoo et al. |
| 6,459,165 B1 | 10/2002 | Schoo |
| 6,864,611 B1 | 3/2005 | Wobben |
| 6,872,049 B2 | 3/2005 | Christensen |
| 6,903,466 B1 | 6/2005 | Mercier et al. |
| 6,943,462 B2 | 9/2005 | Wobben |
| 7,011,598 B2 | 3/2006 | Flamang et al. |
| 7,090,465 B2 | 8/2006 | Flamang et al. |
| 7,179,056 B2 | 2/2007 | Siegfriedsen |
| 7,255,537 B2 | 8/2007 | Flamang et al. |
| 7,335,128 B2 | 2/2008 | Flamang et al. |
| 7,431,676 B2 | 10/2008 | Tesar |
| 7,538,446 B2 | 5/2009 | Bonnet |
| 2004/0219020 A1* | 11/2004 | Flamang et al. ........ 416/170 R |
| 2004/0247437 A1 | 12/2004 | Otaki et al. |
| 2010/0009803 A1* | 1/2010 | Giger .......................... 475/346 |

FOREIGN PATENT DOCUMENTS

| | | |
|---|---|---|
| DE | 102007047317 A1 | 4/2009 |
| EP | 1 045 140 A2 * | 10/2000 |
| JP | 5079450 | 3/1993 |
| JP | 2002303254 | 10/2002 |
| WO | 2005075822 | 8/2005 |
| WO | 2008104257 A1 | 9/2008 |

OTHER PUBLICATIONS

Machine Translation of DE 10 2007 047317. 7 sheets. May 10, 2012.*
International Search Report for application PCT/US2010/045103 dated May 24, 2011.

* cited by examiner

Primary Examiner — Javaid Nasri
(74) Attorney, Agent, or Firm — Trego, Hines & Ladenheim, PLLC

(57) ABSTRACT

A generator drive apparatus includes: a rotor shaft having a generally annular open end; a gear unit including a stationary member and a plurality of intermeshed gears, the gear unit disposed at least partially within the open end and drivingly coupled to the rotor shaft; and an electric power generator mounted to the stationary member and drivingly coupled to the gear set.

18 Claims, 4 Drawing Sheets

ROTOR-SHAFT INTEGRATED GENERATOR DRIVE APPARATUS

BACKGROUND OF THE INVENTION

This invention relates generally to electric power generation, and more particularly to a gear drive apparatus for electric power generators.

The use of wind turbines for generating electrical power is well known. A conventional wind turbine includes a nacelle mounted atop a tall tower. The nacelle carries a turbine rotor at one end. Inside the nacelle, a rotor shaft couples the rotor to a gearbox, which is in turn coupled to a separate electrical generator. This leads to a long drivetrain. As a result, the element that provides structural support to the rotor, gearbox, and generator, referred to as a "bedplate," is quite large and heavy, as is the nacelle.

In operation, wind forces acting on the nacelle cause deflection of the bedplate. This leads to misalignment between axes of the rotor shaft and the gearbox. The input shaft bearings of the gearbox have to carry the load imposed by this misalignment. In essence, the rotor shaft bearings and the input shaft bearings of the gearbox are "fighting" each other. This leads to excessive wear or damage, or requires the use of excessively heavy and expensive components if they are over-designed to withstand such loads.

BRIEF SUMMARY OF THE INVENTION

These and other shortcomings of the prior art are addressed by the present invention, which provides a generator and gear unit integrated with a rotor shaft into a compact unit.

According to one aspect of the invention, a generator drive apparatus includes: a rotor shaft having a generally annular open end; a gear unit including a stationary member and a plurality of intermeshed gears, the gear unit disposed at least partially within the open end and drivingly coupled to the rotor shaft; and an electric power generator mounted to the stationary member and drivingly coupled to the gear unit.

According to another aspect of the invention, a generator drive apparatus includes: a stationary frame having a central opening therein; a rotor shaft having a generally annular open end which is mounted for rotation in the frame; a gear unit including a stationary member which is mounted to the frame, and a plurality of intermeshed gears, the gear unit being disposed at least partially within the open end and drivingly coupled to the rotor shaft; and an electric power generator mounted to the stationary member and drivingly coupled to the gear unit.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
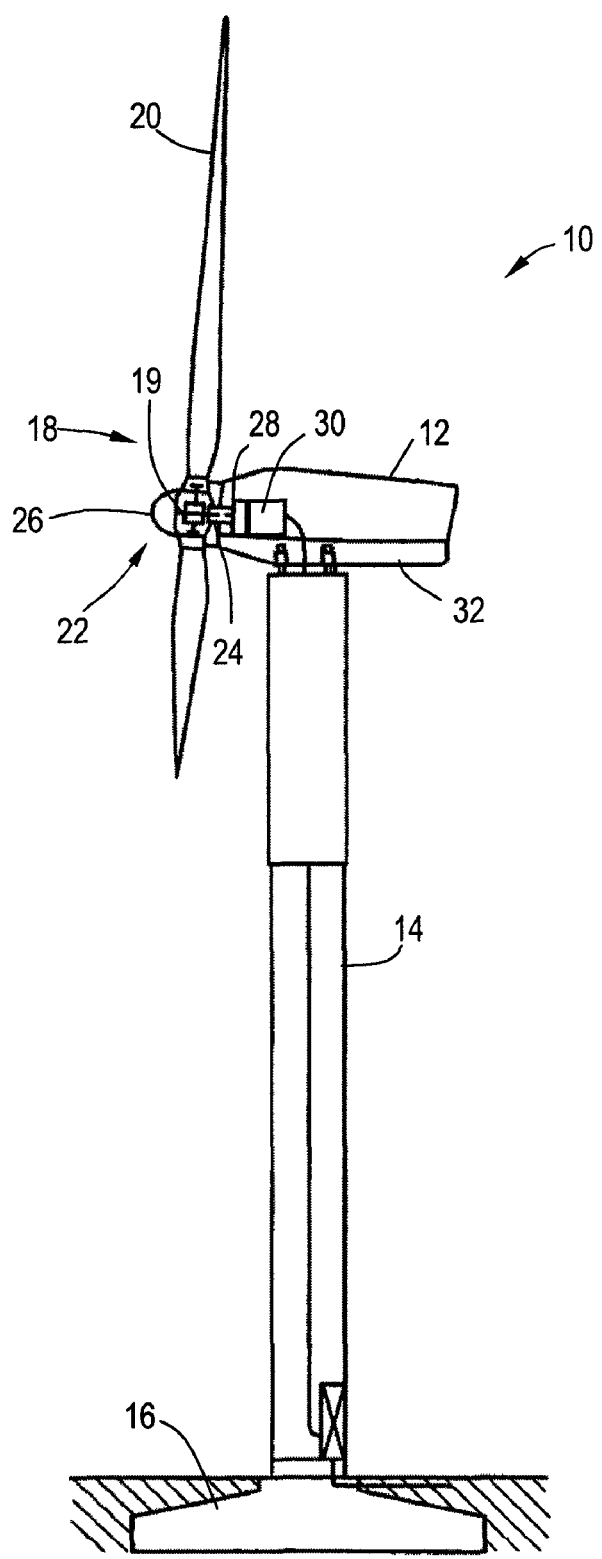
FIG. 1 is a partially-sectioned side view of a wind turbine including a generator drive unit constructed in accordance with an aspect of the present invention.

Referring to the drawings wherein identical reference numerals denote the same elements throughout the various views, FIG. 1 depicts a wind turbine 10 including a nacelle 12 mounted on the upper end of a tower 14. The tower 14 is anchored to the ground via foundations 16. A rotor 18 having airfoil-shaped blades 20 extending from a hub 22 is carried at one end of the nacelle 12. The hub 22 has inboard and outboard ends 24 and 26, respectively. The rotor 18 is of a known type having a pitch change mechanism 19 capable of varying the pitch angle of the blades 20 in order to control the rotational speed of the rotor 18 and/or to provide a feathering function. A gear unit 28 is integrated within the inboard end 24, and this gear unit 28, which is described in more detail below, is in turn coupled to an electric power generator 30. As used herein, the term "electric generator" refers to any electric machine which converts mechanical work to electric current without regard to its output characteristic, and the term includes both DC machines commonly referred to as "generators" as well as AC machines which are commonly referred to as "alternators." It is noted that, while the generator drive apparatus described herein is particularly suited for use with wind turbines, the principles of the present invention may be applied in any situation in which a compact drive for an electrical machine is required.

Figure 2:
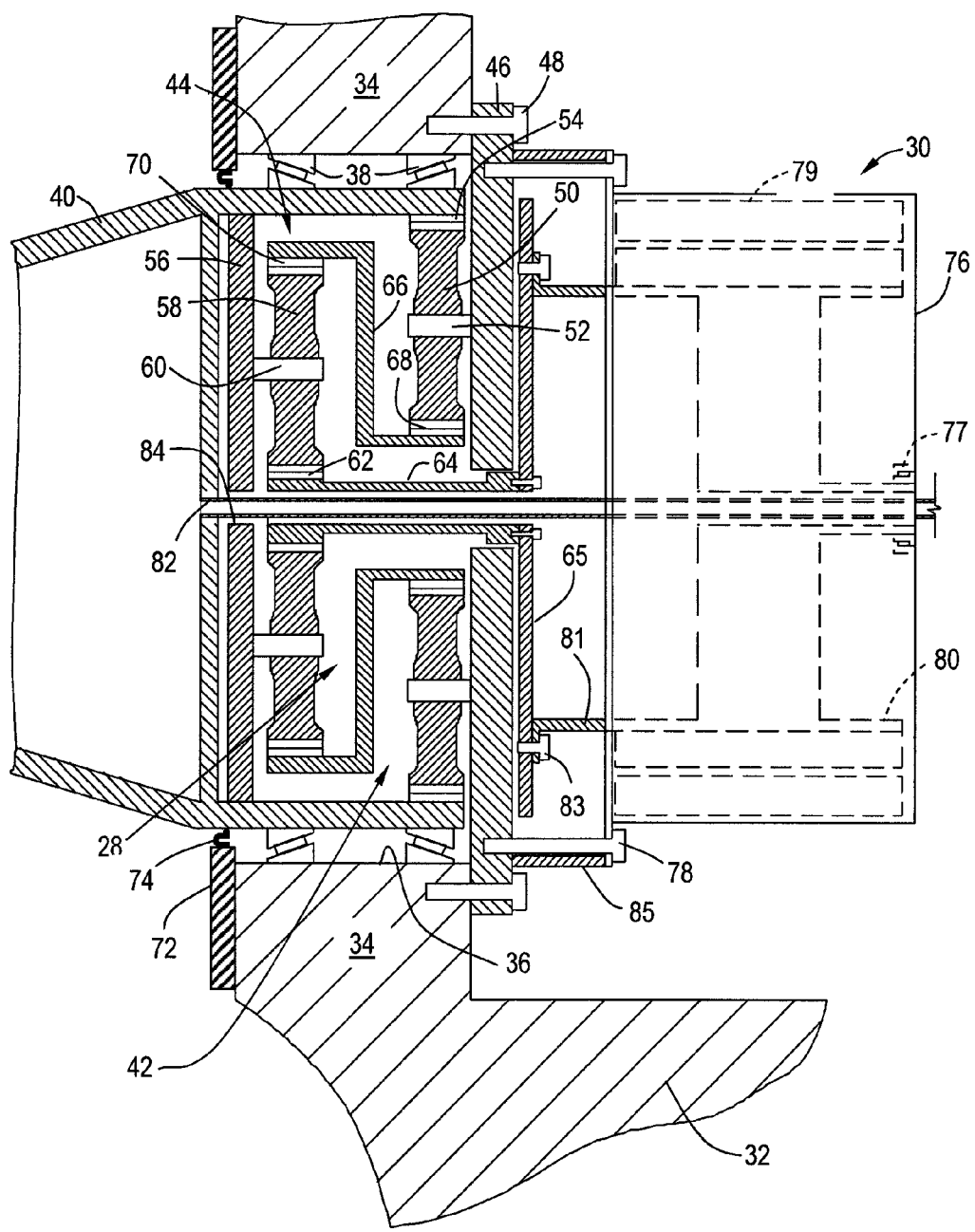
FIG. 2 is a cross-sectional view of a generator drive apparatus.

Within the nacelle 12 is a stationary structural member referred to as a bedplate 32. This may be a casting, forging, built-up structure or the like. The function of the bedplate 32 is to provide a rigid mounting for the operating components of the wind turbine 10. As seen in FIG. 2, the bedplate 32 carries a frame 34 having a central opening 36 into which are mounted rotor bearings 38. In the illustrated example a pair of spaced-apart rolling element bearings are used. The rotor bearings 38 in turn receive an annular, hollow rotor shaft 40, which is part of the inboard end 24 of the hub 22 and turns with the blades 20. The rotor shaft 40 at least partially encloses the gear unit 28.

The illustrated gear unit 28 is a planetary unit including a low speed ("LS") stage 42 and a high speed ("HS") stage 44. It is noted that, as used herein, the terms "high speed" and "low speed" are relative (e.g., the high speed stage operates at a speed higher than the low speed stage) and do not refer to any specific operating speed range. A stationary, plate-like, low speed planet carrier 46 is secured to the frame 34, for example using the illustrated bolts 48 or other suitable fasteners. Low speed planet gears 50 rotate about shafts 52 mounted to the low speed planet carrier 46. The low speed planet gears 50 mesh with an outer ring gear 54, which rotates with the rotor shaft 40.

Opposite the LS stage 42, a plate-like high speed planet carrier 56 is received in and rotates with the rotor shaft 40. The high speed planet carrier 56 may be mounted to the rotor shaft 40 so that it can be easily removed for maintenance or repairs, for example using a bolted or splined connection. High speed planet gears 58 rotate about shafts 60 mounted to the high speed planet carrier 56. The high speed planet gears 58 mesh with a sun gear 62 which rotates with, and may be a part of an output shaft 64. The output shaft 64 is considered to be an output element of the gear unit 28. A plate-like drive coupling 65 is secured to the output shaft 64.

An annular coupling member 66 is disposed between the LS and HS stages 42 and 44 and carries first and second ring gears 68 and 70 which mesh with the low speed planet gears 50 and high speed planet gears 58, respectively. In the illustrated example the coupling member 66 has a generally "Z"-shaped cross-section in order to give the gear unit 28 a compact diameter.

It will be understood that only the primary functional components of the gear unit 28 are illustrated herein, and that the gear unit 28 may include commonly known elements such as bearings, seals, and the like as required for a particular application. Furthermore, it will be understood that a different type of gear train may be substituted for the illustrated planetary set.

The rotor shaft 40 forms a housing for the gear unit 28. A cover 72 and seals 74 may be provided to close off the housing so that lubrication oil may be contained therein.

The electric power generator 30 includes a stationary housing 76, which encloses a field coil 79 and a rotor 80 of conventional construction, both of which are shown schematically. One end of the rotor 80, which has an open center, is supported for rotation in the housing 76 by a bearing 77, such as the illustrated rolling-element bearing. An annular rotor coupling 81, which may be integral with the rotor 80, extends from the housing 76 and engages the drive coupling 65. In the illustrated example the drive coupling 65 and the rotor coupling 81 are connected using bolts 83 or other suitable fasteners to transfer torque between the two members. The housing 76 is secured to the low speed planet carrier 46, for example using the illustrated bolts 78, which pass through an annular coupling frame 85 that is interposed between the housing 76 and the low speed planet carrier 46.

A hollow central pitch tube 82 allows a pathway through the electric power generator 30 and gear unit 28 to the rotor 18. For example, this pathway may be used to make a functional connection between the pitch change mechanism 19 and the interior of the nacelle 12. The specific type of functional connection will depend upon the type of pitch change mechanism 19. Examples of these connections include pressurized oil flow, electrical conductors, or mechanical linkages such as tubes, rods, or cables. In the illustrated example, the pitch tube 82 is attached to and rotates with the rotor shaft 40, and an opening 84 is provided through the high speed planet carrier 56 for the pitch tube 82 to pass through. Alternatively, depending on how the pitch change mechanism is operated, the output shaft 64 may be solid and the opening 84 eliminated.

In operation, the gear unit 28 converts the relatively high torque, low speed (e.g., about 15 RPM) rotational input from the rotor 18 to a higher speed (e.g., about 345 RPM), lower torque input suitable for operation of the electric power generator 30. More specifically, as the rotor shaft 40 rotates at low speed, this rotates the outer ring gear 54, which in turn rotates the low speed planet gears 50. The low speed planet gears 50 in turn rotate the annular coupling member 66, which, as noted above, is disposed between the LS and HS stages 42 and 44 and carries first and second ring gears 68 and 70. Rotation of the second ring gear 70 in turn causes rotation of the high speed planet gears 58, which together rotate the sun gear 62. The rotor shaft 30 also rotates the high speed planet carrier 56. Thus, torque transmission from the rotor shaft 40 to the sun gear 62 is split along two paths. Rotation of the sun gear 62 results in rotation of the output shaft 64, the drive coupling 65, the rotor coupling 81, and the generator rotor 80. The various gears and components are sized in accordance with known practices to achieve the desired speed ratio.

When maintenance or repairs are needed, the electric power generator 30 may be removed by simply removing the bolts 78 and 83, and pulling it away from the gear unit 28. Furthermore, the gear unit 28 or its components may be serviced or replaced by removing bolts 48 and extracting it as a single unit while leaving the rotor shaft 40 intact and supported by the rotor shaft bearings 38.

Figure 3:
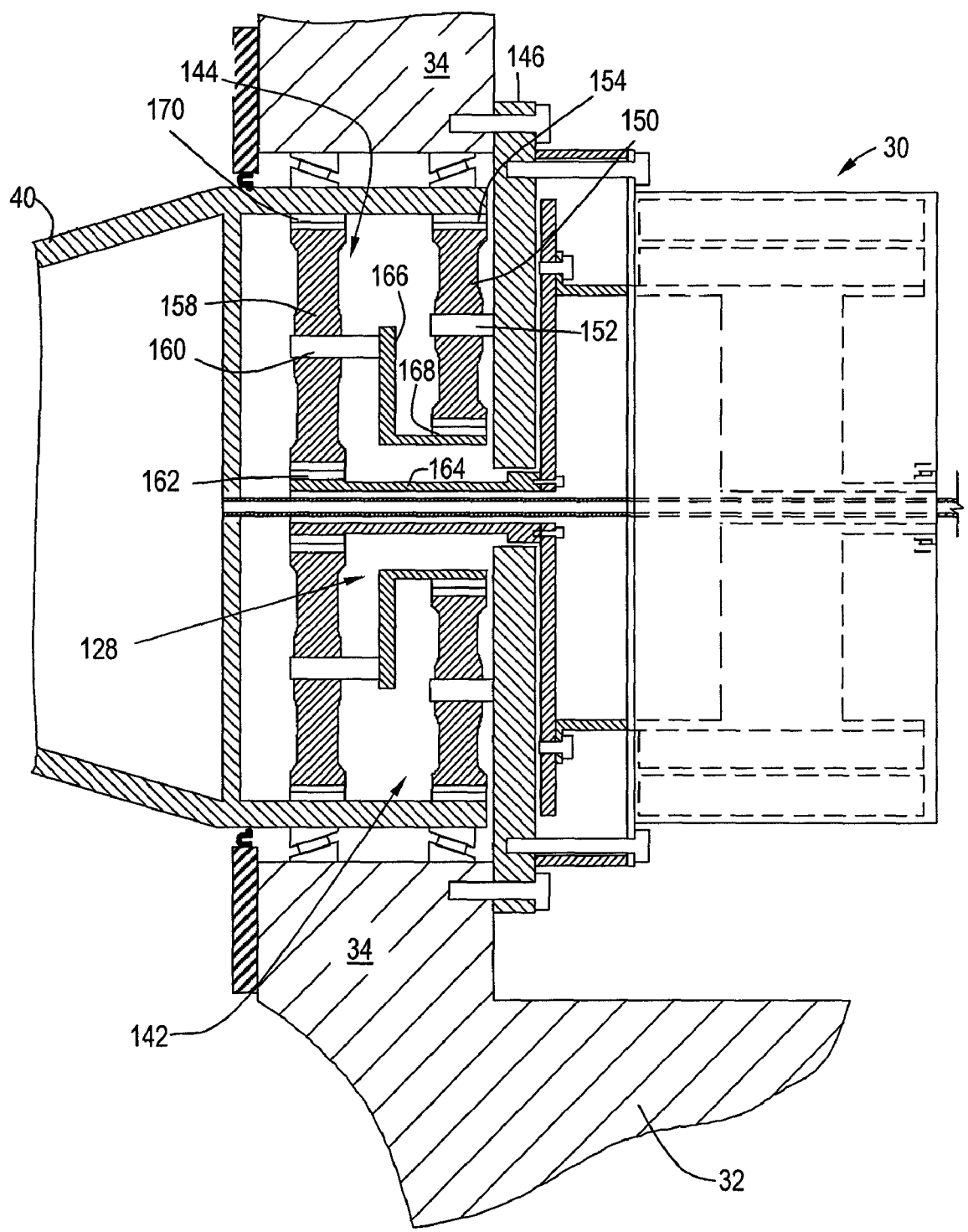
FIG. 3 is a cross-sectional view of an alternative generator drive apparatus.

FIG. 3 illustrates an alternative embodiment using a gear unit 128 that is substantially similar to the gear unit 28 except for the internal arrangement of the HS stage 144. A stationary, plate-like low speed planet carrier 146 is secured to the frame 34. Low speed planet gears 150 rotate about shafts 152 mounted to the low speed planet carrier 146. The low speed planet gears 150 mesh with an outer ring gear 154, which rotates with the rotor shaft 40.

An annular coupling member 166 is disposed adjacent the LS stage 142 and carries a first ring gear 168 which meshes with the low speed planet gears 150 and high speed planet gears 158, respectively. In the illustrated example the coupling member 166 has a generally "L"-shaped cross-section.

Opposite the LS stage 142, high speed planet gears 158 rotate about shafts 160 mounted to the coupling member 166. The high speed planet gears 158 mesh with a sun gear 162 and with a second outer ring gear 170 which rotates with the rotor shaft 40. The sun gear 162 rotates with an output shaft 164, i.e., the output shaft 164 is connected to the sun gear 162 so that the output shaft 164 rotates when the sun gear 162 is rotated.

Figure 4:
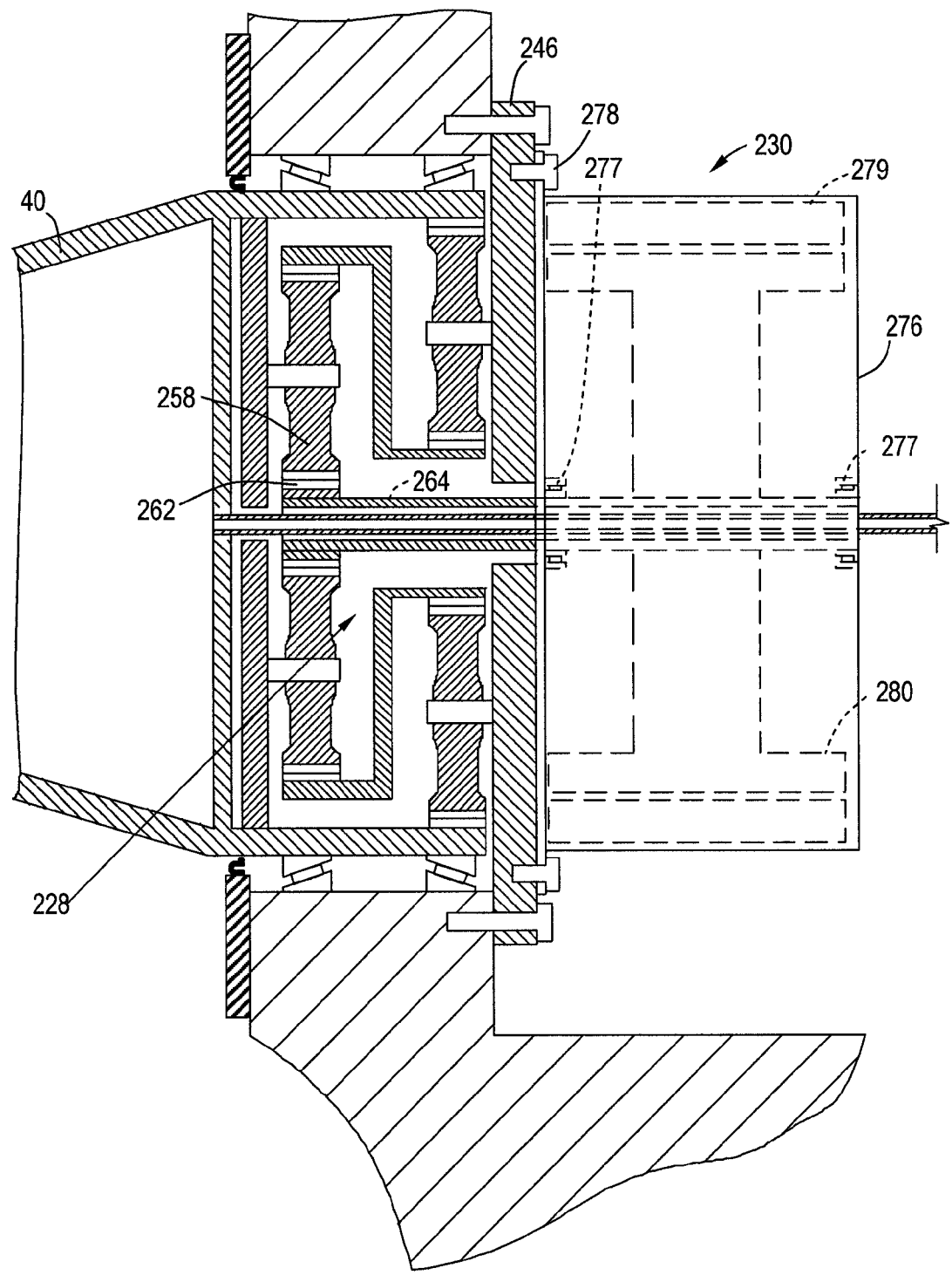
FIG. 4 is a cross-sectional view of another alternative generator drive apparatus.

FIG. 4 illustrates an alternative gear unit 228 that is similar in construction to the gear units 28 and 128 described above, the primary difference being the configuration of the output shaft. The gear unit 228 will be described as a variation of the gear unit 28, with the understanding that the same shaft configuration could be used with gear units 28 or 128.

The associated electric power generator 230 includes a stationary housing 276, which encloses a field coil 279 and a rotor 280. The rotor 280, which has an open center, is fully supported for rotation by bearings 277 located at opposite ends of the housing 276, such as the illustrated rolling-element bearings. One end of the rotor 280 extends from the housing 276 so as to form an output shaft 264. The housing 276 is secured to the low speed planet carrier 246, for example using the illustrated bolts 278. The distal end of the output shaft 264 is received in a sun gear 262 of the gear unit 228. For example, a splined connection may be used. For replacement or maintenance the bolts 278 may be removed and the electric power generator 230 removed along with the output shaft 264, leaving the sun gear 262 in place meshed with the high speed planet gears 258.

In regards to any of the embodiments described herein, the rotor shaft 40 may have an open end, meaning a hollow or open interior portion at the end of the rotor shaft that is capable of housing various gear components and possibly other components. ("Open" does not mean that the interior of the hollow shaft is exposed to the outside of the wind turbine, at least not when the turbine is fully assembled for use.) For example, in FIG. 2, the area between the rotor bearings 38 may be considered to be an open end portion of the rotor shaft 40. In one embodiment, the open end is generally annular, meaning, unless otherwise specified, that the open end is at least partly round or circular. In one embodiment, the gear unit is disposed at least partially within the open end of the rotor shaft. In another embodiment, all the various gears of the gear unit are disposed within the open end of the rotor shaft. For example, with reference to FIG. 2, all the gears 50, 58, 62, and 66 of the gear unit are all located within the rotor shaft open end, and none of the gears 50, 58, 62, and 66 are located outside the rotor shaft open end.

Another embodiment relates to a generator drive apparatus. The apparatus comprises a stationary frame 34 having a central opening 36 therein, a rotor shaft 40 having a generally annular open end that is mounted for rotation in the frame, a gear unit 28, 128, 228, and an electric power generator 30, 230. The gear unit includes a stationary member 46, 146, 246 that is mounted to the frame, a plurality of intermeshed gears, and an output shaft 64, 164, 264. The electric power generator 30, 340 is mounted to the stationary member and drivingly coupled to the gear unit. The plurality of gears, which comprise all the gears of the generator drive apparatus, are disposed within the open end of the rotor shaft and drivingly coupled to the rotor shaft. The plurality of gears comprise a plurality of first planet gears 50, 150, a plurality of second planet gears 58, 158, 258, a coupling member 66, 166, and a sun gear 62, 162, 262. The sun gear is attached to the output shaft of the gear unit. The stationary member of the gear unit is incorporated as a first carrier having the plurality of first planet gears attached thereto. The first planet gears engage a first outer ring gear 54, 154 carried by the rotor shaft. The plurality of first planet gears engage a first ring gear 68, 168 of the coupling member for rotating the coupling member. The coupling member engages the plurality of second planet gears for rotating the second planet gears, e.g., in the manner of FIGS. 2 and 4 or in the manner of FIG. 3. The second planet gears engage the sun gear for rotating the sun gear and the output shaft.

The gear unit configurations described above have several advantages over prior art designs. The imposed bending moments into the gear unit are basically zero because the gear unit is contained within the rotor shaft 40 and there is no separate long shaft. The HS stage has the same axis as the rotor shaft 40 and the rotor bearings 38 function as input shaft bearings for the gear unit. Because of the reduced size, the weight of the nacelle 12 is lower, making it less costly to haul it up for assembly to the tower 14. The bedplate 32 will also be smaller and simpler because fewer mounting interfaces are required.

Also, fewer components are present in the differential planetary section, e.g., no gear casing is required, the rotor shaft 40 forms the connection between the HS stage and the outer ring gear of the LS stage, no input shaft bearing is used, and no separate torque arms are required to hold the low speed carrier stationary. The gear unit will have high reliability because no high speed bearing is required.

The foregoing has described a generator drive apparatus for a wind turbine. While specific embodiments of the present invention have been described, it will be apparent to those skilled in the art that various modifications thereto can be made without departing from the spirit and scope of the invention. Accordingly, the foregoing description of the various embodiments of the invention and the best mode for practicing the invention are provided for the purpose of illustration only and not for the purpose of limitation, the invention being defined by the claims.

What is claimed is:

1. A generator drive apparatus, comprising:
    a rotor shaft having a generally annular open end, wherein the open end is rotatably mounted in an opening of a stationary frame;
    a gear unit including a stationary member stationary member having opposed first and second sides, the stationary member being mounted to the frame with the first side in contact with the frame, and a plurality of intermeshed gears, the gear unit disposed at least partially within the open end and drivingly coupled to the rotor shaft, wherein the gear unit includes an output shaft connected to an annular drive coupling disposed on the second side of the stationary member; and
    an electric power generator mounted to the stationary member in contact with the second side and drivingly coupled to the gear unit by an annular rotor coupling which is connected to the drive coupling on the second side of the stationary member.

2. The apparatus of claim 1 wherein the gear unit comprises a planetary gear set.

3. The apparatus of claim 1 further comprising a hollow pitch tube that extends through the gear unit and the electric power generator.

4. The apparatus of claim 1 wherein the gear unit comprises the stationary member configured as a first carrier having a plurality of first planet gears attached thereto, the first planet gears engaging a first outer ring gear carried by the rotor shaft.

5. The apparatus of claim 4 wherein the gear unit further comprises a second carrier having a plurality of second planet gears attached thereto, the second carrier rotating with the rotor shaft.

6. The apparatus of claim 5 wherein the gear unit includes a coupling member having first and second ring gears meshed with the first and second planet gears, respectively.

7. The apparatus of claim 4 wherein the gear unit further comprises a coupling member including:
    a first ring gear meshed with the first planet gears; and
    a plurality of second planet gears, wherein the second planet gears are meshed with a sun gear and with a second outer ring gear which is carried by the rotor shaft.

8. The apparatus of claim 1 wherein the gear unit is configured so as to be removable from the rotor shaft as a single unit.

9. A generator drive apparatus, comprising:
    a stationary frame having a central opening therein;
    a rotor shaft having a generally annular open end wherein the open end is mounted for rotation in the frame by one or more bearings which are mounted in the central opening;
    a gear unit including a stationary member having opposed first and second sides, the stationary member being mounted to the frame with the first side in contact with the frame, and a plurality of intermeshed gears, the gear unit being disposed at least partially within the open end and drivingly coupled to the rotor shaft, wherein the gear unit includes an output shaft connected to an annular drive coupling disposed on the second side of the stationary member; and
    an electric power generator mounted to the stationary member in contact with the second side and drivingly coupled to the gear unit by an annular rotor coupling which is connected to the drive coupling on the second side of the stationary member.

10. The apparatus of claim 9 wherein the gear unit includes the stationary member incorporated as a first carrier having a plurality of first planet gears attached thereto, the first planet gears engaging a first outer ring gear carried by the rotor shaft.

11. The apparatus of claim 10 wherein the gear unit comprises a second carrier having a plurality of second planet gears attached thereto, the second carrier rotating with the rotor shaft.

12. The apparatus of claim 11 wherein the gear unit includes a coupling member having first and second ring gears meshed with the first and second planet gears, respectively.

13. The apparatus of claim 10 wherein the gear unit further comprises a coupling member including:
    a first ring gear meshed with the first planet gears; and
    a plurality of second planet gears, wherein the second planet gears are meshed with a sun gear and with a second outer ring gear which is carried by the rotor shaft.

14. The apparatus of claim 9 further comprising a hollow pitch tube that extends through the gear unit and the electric power generator.

15. The apparatus of claim 9 wherein the rotor shaft is a part of a hub which includes:
    a pitch change mechanism; and one or more airfoil-shaped blades extending from the hub and coupled to the pitch change mechanism.

16. The apparatus of claim 9 wherein the frame is a portion of a bedplate which is carried atop an upright tower.

17. The apparatus of claim 9 wherein the gear unit is configured such that at least part of the gear unit may be withdrawn from the rotor shaft open end while the rotor shaft remains supported for rotation within the frame.

18. A generator drive apparatus, comprising:
a stationary frame having a central opening therein;
a rotor shaft having a generally annular open end wherein the open end is mounted for rotation in the frame by one or more bearings which are mounted in the central opening;
a gear unit including a stationary member having opposed first and second sides, the stationary member being mounted to the frame with the first side in contact with the frame, a plurality of intermeshed gears, and an output shaft, the plurality of gears comprising all the gears of the generator drive apparatus and being disposed within the open end and drivingly coupled to the rotor shaft, wherein the gear unit includes an output shaft connected to an annular drive coupling disposed on the second side of the stationary member; and
an electric power generator mounted to the stationary member and drivingly coupled to the gear unit by an annular rotor coupling which is connected to the drive coupling on the second side of the stationary member; wherein:
the plurality of intermeshed gears of the gear unit comprise a plurality of first planet gears, a plurality of second planet gears, a coupling member, and a sun gear, the sun gear being attached to the output shaft of the gear unit;
the stationary member of the gear unit is incorporated as a first carrier having the plurality of first planet gears attached thereto, the first planet gears engaging a first outer ring gear carried by the rotor shaft;
the plurality of first planet gears engage a first ring gear of the coupling member for rotating the coupling member;
the coupling member engages the plurality of second planet gears for rotating the second planet gears; and
the second planet gears engage the sun gear for rotating the sun gear and the output shaft.

* * * * *